United States Patent [19]

Kasuga et al.

[11] Patent Number: 4,596,847
[45] Date of Patent: Jun. 24, 1986

[54] POLYACETAL RESIN COMPOSITION

[75] Inventors: Takuzo Kasuga, Tokyo; Yukio Ikenaga, Fuji; Masami Yamawaki, Fuji; Keizo Tanimura, Fuji, all of Japan

[73] Assignee: Polyplastics Co., Ltd., Osaka, Japan

[21] Appl. No.: 796,527

[22] Filed: Nov. 12, 1985

Related U.S. Application Data

[63] Continuation of Ser. No. 612,935, May 22, 1984, abandoned.

[30] Foreign Application Priority Data

May 25, 1983 [JP] Japan .................................. 58-92095

[51] Int. Cl.$^4$ .......................... C08K 5/06; C08K 5/20; C08L 59/04; C08L 59/02
[52] U.S. Cl. .................................... 524/220; 524/221; 524/223; 524/226; 524/377; 524/509; 524/593
[58] Field of Search ............... 524/593, 377, 509, 220, 524/221, 223, 226

[56] References Cited

U.S. PATENT DOCUMENTS

| | | | |
|---|---|---|---|
| 3,001,966 | 9/1961 | Funck | 524/593 |
| 3,116,267 | 12/1963 | Dolce | 524/226 |
| 3,133,896 | 5/1964 | Dolce | 524/226 |
| 3,137,669 | 6/1964 | Bragaw | 524/593 |
| 3,201,371 | 8/1965 | Behrends | 524/593 |
| 3,340,219 | 9/1967 | Stemmler | 524/593 |
| 3,385,808 | 5/1968 | von Bonin | 524/593 |
| 3,442,850 | 5/1969 | O'Brien | 524/593 |
| 3,787,353 | 1/1974 | Ichihara | 524/226 |
| 3,808,133 | 4/1974 | Brown | 524/593 |
| 4,351,916 | 9/1982 | Kohan | 524/377 |
| 4,559,380 | 12/1985 | Kasuga | 524/377 |

FOREIGN PATENT DOCUMENTS

| | | | |
|---|---|---|---|
| 49-130490 | 12/1974 | Japan | 524/593 |
| 55-84334 | 6/1980 | Japan | 524/221 |
| 56-4638 | 1/1981 | Japan | 524/377 |
| 58-11542 | 1/1983 | Japan | 524/593 |

*Primary Examiner*—C. Warren Ivy
*Attorney, Agent, or Firm*—Burns, Doane, Swecker & Mathis

[57] ABSTRACT

A polyacetal resin composition is provided which has improved antistatic, heat stability and mechanical properties and contains a polyacetal homopolymer or copolymer, carbon black and a nonionic surfactant which is a polypropylene glycol/polyethylene glycol ether copolymer.

10 Claims, No Drawings

POLYACETAL RESIN COMPOSITION

This application is a continuation of application Ser. No. 612,935, filed May 22, 1984, now abandoned.

The present invention relates to a polyacetal resin composition containing carbon black, which has excellent mechanical properties, thermal stability and moldability.

The compounding of carbon black into polyacetal resin has hitherto been practiced not only for the purpose of mere coloration but also for use of this resin in the manufacture of sliding parts, covering parts or the like, by providing the resin with electric conductivity and weatherability. However, addition of an amount of carbon black sufficient to impart the desired performance to the polyacetal resin sometimes brings about notable hindrance to the mechanical properites and the moldability of the polyacetaL resin as well as degradation of the heat stability.

The present invention has been accomplished as a result of earnest studies focused on such disadvantages and relates to a polyacetal resin composition improved with regard to the aforementioned disadvantages by addition of polypropylene glycol/polyethylene glycol ether copolymer to the polyacetal resin composition containing carbon black.

The carbon black used in this invention is appropriately selected according to the purpose for which the composition is to be used, e.g., for imparting electric conductivity and weatherability to polyacetal resin or for coloration. Thus, for the purpose of imparting electric conductivity, carbon black which has a developed structure, small particle diameters, high porosity and a large surface area is suitable preferably electrically conductive furnace black, acetylene black, etc. For the purpose of inhibition against deterioration or coloration, furnace and channel blacks are adequate, but thermal black, etc. may be utilized depending on the ultimate use of the resin. As the carbon black useful in this invention, any of the above-mentioned carbon blacks is usable. The amount of carbon black added may be appropriately selected according to the object, the desirable range being 0.1 to 30 weight % of the total composition. With less than 0.1 weight % of carbon black, it is difficult to achieve the required object, while with more than 30 weight %, its incorporation into the polyacetal resin as well as extrusion becomes difficult. The amount desirable from the aspect of physical properties and compounds is in the range of 0.5 to 10 weight % of the total composition.

The polypropylene glycol/polyethylene glycol ether copolymer useful in this invention is a high molecular weight nonionic surfactant which is a block copolymer consisting of a polypropylene glycol radical or block as the hydrophobic portion and a polyethylene glycol radical or block as the hydrophilic portion. The surfactant may have hydrophobic and hydrophilic radicals or blocks with their molecular weights altered according to intended use of the resin, the mean molecular weight of the hydrophobic radical or block preferably being 1,000 to 2,000 as against the molecular weight of 1,300 to 15,000 of the nonionic surfactant. Addition of polypropylene glycol/polyethylene glycol ether copolymer to the polyacetal resin containing carbon black causes better dispersion of the carbon black into the resin, resulting in enhanced melt fluidity, improved thermal stability and improved moldability. Moreover, such excellent characteristics as lowered volume resistivity, improved mechanical properties, particularly elongation and impact resistance, may be achieved. A preferred amount of polypropylene glycol/polyethylene glycol ether copolymer to be added should be 0.1 to 10 weight %, more preferably, 1 to 5 weight %, of the total resin composition. As the amount added increases the melt fluidity, elongation, impact resistance, etc. may be improved, but an addition over 30 weight % which will cause lowering of the tensile strength is not appropriate.

According to this invention, the polyacetal resin composition may be further compounded with an amide compound. In that way, the thermal stability will be further improved.

The amide compound useful in this invention includes mono- or polycarboxylic acid amide compounds represented by the following general formula and ethylene oxide adducts thereof:

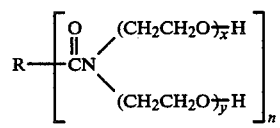

wherein R represents a carboxylic acid residue which is a saturated or unsaturated hydrocarbon radical having 2 or more carbon atoms, preferably 2 to 23 carbon atoms, or R may be a radical representing a fundamental unit of a vinyl polymer or copolymer, n is an integer of 1 or above, preferably 1 to 6, and x and y are each 0 or an integer of 1 or above, preferably 1 to 10.

The amide compounds used according to this invention include those of fatty acids, higher fatty acids, etc. or ethylene oxide adducts thereof, and those of polymers of vinyl compounds or copolymers containing vinyl compounds as major components or ethylene oxide adducts thereof. Examples of the amide compounds are butyramide, caproamide, caprylamide, capramide, lauramide, myristamide, palmitamide, stearamide, behenamide, oleamide, linolamide, linolenamide, erucamide, a natural higher fatty acid amide as a mixture of higher fatty acid amies, succinamide, adipamide, sebacamide, dodecanedicarboxyamide, 1,6-cyclohexanedicarboxyamide, propane-1,2,3-tricarboxyamide, benzamide, phthalamide, terephthalamide, trimellitamide, pyromellitamide, polyacrylamide, polymethacrylamide, ethylene/acrylamide copolymer, and ethylene oxide adducts thereof. These amide compounds may be used alone or in combination of two or more of them. Preferred amide compounds are ethylene oxide adducts of higher fatty acid amides, especially those with the mol number of ethylene oxide added (x+h) of 2 to b 7, which show a prominent effect. The amide compounds should be added in an amount of from 0.1 to 15 weight %, preferably 0.3 to 5 weight % of the total polyacetal resin composition.

The polyacetal useful in this invention is polyoxymethylene homopolymer or polyacetal copolymer with most of its main chain composed of oxymethylene chains. In these polyacetal resins, well-known antioxidants, acid resisting agents and the like may be compounded. Examples of the antioxidants are phenols such as 2,2'-methylenebis(4-methyl-6-t-butyl phenol, hexamethylene glycol bis(3,5-di-t-butyl-4-hydroxyhydrocinnamate), tetrakis [methylene (3,5-di-t-butyl-4-hydroxyhydrocinnamate)[methane, 1,3,5-trimethyl-2,4,6- tris(3,5-di-t-butyl-4-hydroxybenzyl) benzene, 4,4'-methylenebis(2,6-di-t-butylphenol) and 1,3,5-tris(4-t-butyl-3-hydroxy-2,6-dimethylbenzyl) isocyanurate and amines such as N-phenyl-N'-isopropyl-p-phenylenediamine, N,N'-diphenyl-p-phenylenediamine, 4,4'-bis(4-α,α-dimethylbenzyl)diphenylamine, a condensate of biphenylamine with acetone, N-phenyl-β-naphthylamine and N,N'-di-β-naphthyl-p-phenylenediamine. Examples of acid resisting agents are urea, dicyandimaide, melamine, polyamide, alkali or alkaline earth metal salts of lower and higher fatty acids, e.g., calcium stearate, and hydroxides, inorganic salts, alkoxides, etc. of alkali or alkaline earth metals. These antioxidants and acid resisting agents may be used alone or in combinations of two or more of them.

When stearamide, lauric acid diethanolamide, etc. are used as amide compounds in the resin compositions of this invention, the addition of alkyl-substituted diphenylamine, etc. as antioxidants for amines, provides an especially excellent heat stabilizing effect.

With the polyacetal resin composition of this invention, a well-known weathering stabilizer, e.g., ultraviolet ray stabilizer or photostabilizer, may be used. Examples of such agents include ultraviolet ray stabilizers such as salicylate compounds, benzophenone compounds or benzotriazole compounds, and photostabilizers such as hindered amines.

In practicing this invention, the use, in addition to the additives mentioned above, of additives which further improve dispersion of carbon black, e.g., oligomers, are recommended. Oligomrs are polymers havig low molecular weights which themselves are lacking in moldability, and they should preferably be solid at normal temperature for ease of addition. As examples, there may be mentioned paraffin wax, microcrystalline wax, and polyolefin waxes such as polyethylene wax or polypropylene wax. As a polyethylene wax, those manufuctured by thermal decomposition of high-pressure polyethylene resin of a high molecular weight, or by direct polymerization of an ethylene monomer are useful. Generally, polyethylene wax having its molecular weight lowered by thermal decomposition at a high temperature of 300° C. or above contains branches and polar radicals, so that is is especially preferable in regard to dispersibility, etc. to use polyethylene mainly composed of hydrocarbons obtained by direct polymerization. An example of other well-known carbon black dispersants is oil. The dispersants may be used as a mixture of two or more of them. They further improve heat stability and mold-ability, because they enhance dispersion of carbon black, enabling a polyacetal resin to be obtained with uniform and stable mechanical properties. The desirable amount of polyolefin waxes such as the aforementioned polyethylene wax should be 0.3 to 3 weight %, preferably 0.5 to 2 weight % of the resin composition.

Among the compositions of this invention constituted as mentioned above, those containing electrically conductive carbon black for the purpose of improving electrical conductivity, can be made at reduced cost, because the addition of only a small amount of carbon black provides excellent electrical properties.

The compositions of the present invention when molded, provide articles that exhibit antistatic property, improved resistance to abrasion and improved durability. Such articles can be used as parts of electric instruments, motor cars and other instruments, such as a rotatable member, a shaft-bearing member and a slidable member. For example the compositions of the present invention can be used in the manufacture of parts of audio tape recorders and video tape recorders, such as a gear, a cam, a lever, a guiding member and a catch. It also applies to parts of a tape cassette, such as a guiding member, a roller, a post, a ball and a pin, which come in sliding contact with running tape.

In a video start tape recorder, parts have been made of metal materials through complicated manufacturing steps such as processing of metal pieces and surface polishing. This is disadvantageous in that it tends to make the products more expensive to produce.

Therefore, plastic materials have been sought to replace metal in the maufacture of these parts. One problem that has been encountered with plastics is that they are easily charged electrostatically when in contact with the running tape. The electrostat charge disturbs the video image, produces noises in recording and playing back of sounds and attracts contaminants in the air that abrade the surfaces of the plastics parts and the tape, damaging the image reproduction capabilities of the tape and increasing friction.

The compositions of the present invention solve these problems in that they possess the antistatic property, improved mechanical properties, which result in reduced and abrasion.

The invention applies also to a rotatable member, a sliding member and other parts of the mechanism of various business machines such as facsimiles, copying machines, computers, radios, cameras and fiber machines. When the invention is applied to the paper feeding mechanism in facsimile and copying machines, the electrostatic charge is not produced and paper running is improved. The compositions of the invention are useful in removing the electrostatic charge which develops during transmission of articles, for example as parts of feeding pipes, both inlet and outlet. In this way feeding machines are improved by the invention.

The composition of this invention may be readily prepared by methods used for resins containing fillers. For example, a method of preparing pellets by kneading in and extruding the components by use of an extruder after mixing, followed by molding, a method of mixing pellets of different compositions before molding and obtaining the composition by molding and a method of directly charging the components into a molder are available.

To the polyacetal resin composition of this invention, well-known additives such as varieties of organic high molecular materials or inorganic fillers may be added. The organic high molecular materials include, for example, polyurethane, fluororesins, vinyl polymers and copolymers such as ethylene/vinyl acetate copolymer, ethylene/alkyl acrylate copolymer, styrene/butandiene/acrylonitrile copolymer and styrene, acrylonitrile copolymer, a polyphase graft copolymer composed of polyacrylate resin and thermoplastic segment type copolyester. Inorganic fillers refer, for example, to glass fiber, carbon fiber, potassium titanate fiber, glass flake, mica, talc and metal foil. Antistatic agents, coloring agents, lubricants, mold releasing agents, nucleating agents, stabilizers or surface active agents may be added to provide the properties called for in the final product.

This invention will now be described in more detail with reference to embodiments and comparative examples; however, this does not imply that this invention is limited to them.

EXAMPLES 1 to 10 AND COMPARATIVE EXAMPLES 1 and 2

Polyacetal resin powder (Duracon, a commercially available polyacetal copolymer manufactured by Polyplastics Co., Ltd.) was mixed with electrically conductive carbon black and polypropylene glycol/polyethylene glycol ether copolymer of compositions shown in Table 1, lauric acid diethanolamide (2 weight %), and low molecular weight polyethylene wax (molecular weight 5,000, manufactured by thermal decomposition) (1 weight %) in a Henschel mixer and the mixture was melted and kneaded by use of a 28 mm two-axis extruder, thereby preparing a pellet form composition. Thereafter, text pieces were formed from this pellet using an extrusion-molder and their physical properties were measured. Measurements of the fluidity and heat stability were made of pellets per se. On the other hand, as a comparative example, similar measurements were made of a composition not containing polypropylene glycol/polyethylene glycol ether copolymer.

The values of fluidity listed are those obtained by measurements with use of a melt indexer set at 190° C. The values of heat stability refer to the rate of weight reduction by heating per minute (%/min) when a pellet is heated in air at 230° C. for 45 minutes. Volume resistivity was calculated from resistance at both ends of a test piece coated with an electrically conductive paint on both ends thereof and dried. Tensile elongation was measured by the method of ASTM D 638 and the Izod impact strength by the method of D 256.

TABLE 1

| | | Amount of Addition (wt %) | Physical Properties | | | | | |
|---|---|---|---|---|---|---|---|---|
| | | Carbon[*1] black | Polypropylene glycol/Polyethylene glycol ether copolymer | Fluidity (g/10 min) | Heat stability (%/min) | Volume resistivity ($\Omega \cdot$ cm) | Tensile elongation (%) | Izod impact strength | |
| | | | | | | | | notched (kg · cm/cm) | not notched (kg · cm/cm) |
| Example | 1 | 4.5 | 1.0 | 11.2 | 0.024 | 780 | 8.7 | 3.8 | 66.8 |
| | 2 | 4.5 | 2.0 | 11.6 | 0.022 | 61 | 9.8 | 3.8 | 67.2 |
| | 3 | 4.5 | 2.0[*2] | 11.0 | 0.023 | 100 | 9.5 | 3.6 | 66.5 |
| | 4 | 4.5 | 3.0 | 12.9 | 0.019 | 58 | 12.4 | 4.6 | 72.6 |
| | 5 | 4.5 | 5.0 | 13.2 | 0.019 | 53 | 16.8 | 4.9 | 87.5 |
| | 6 | 4.5 | 8.0 | 13.8 | 0.018 | 49 | 17.2 | 4.8 | 86.8 |
| | 7 | 5.0 | 3.0 | 12.4 | 0.019 | 40 | 13.8 | 4.4 | 68.2 |
| | 8 | 5.0 | 3.0[*2] | 11.2 | 0.022 | 70 | 9.5 | 4.0 | 65.8 |
| | 9 | 6.0 | 3.0 | 7.6 | 0.023 | 35 | 9.3 | 4.0 | 61.0 |
| | 10 | 7.0 | 4.0 | 4.8 | 0.024 | 20 | 6.5 | 3.8 | 59.0 |
| Comparative Example | 1 | 4.5 | 0 | 10.7 | 0.028 | $3 \times 10^{13}$ | 6.1 | 3.6 | 64.7 |
| | 2 | 5.0 | 0[*2] | 5.6 | 0.080 | $4 \times 10^{12}$ | 9.0 | 3.4 | 60.8 |

[*1]Ketjen black EC manufactured by Lion Akzo Co., Ltd.
[*2]This composition contains neither lauric acid diethanolamide nor low molecular weight polyethylene wax.

EXAMPLE 11 AND COMPARATIVE EXAMPLE 3

Polyacetal resin powder (Duracon, a commercially available polyacetal copolymer manufactured by Polyplastics Co., Ltd.) was mixed with, as in Example 1, furnace black and polypropylene glycol/polyethylene glycol ether copolymer of compositions shown in Table 2 and lauric acid diethanolamide (2 weight %). Pellets were prepared from this mixture and measurements of physical properties were made. As a comparative example, similar measurements were made of a composition not containing polypropylene glycol/polyethylene glycol ether copolymer.

TABLE 2

| | Amount of Addition (wt %) | | Physical Properties | |
|---|---|---|---|---|
| | Carbon[*1] black | Polypropylene glycol/Polyethylene glycol ether copolymer | Heat stability (%/min) | Tensile strength (%) |
| Example 11 | 2.0 | 2.0 | 0.027 | 60 |
| Comparative Example 3 | 2.0 | 0 | 0.042 | 22 |

[*1]Furnace black

EXAMPLE 12 AND COMPARATIVE EXAMPLE 4

Polyacetal resin powder (Duracon, a commercially available polyacetal copolymer manufactured by Polyplastics Co., Ltd.) was mixed with, in a manner similar to that employed in Example 1, polypropylene glycol/polyethylene glycol ether copolymer (3 weight %), furnace black (3 weight %) and lauric acid diethanolamide (2 weight %). From this mixture, pellets were prepared. Pieces (120×120 mm square, 3 mm thick) were molded from the pellets thus prepared, using a molder, and a falling weight impact test was conducted on these pieces (Table 3). The impact value is given by the 50% breakdown energy (the impact energy when 50% of the total number of the test pieces are broken down) as measured by using a tester of JIS K 7211.

TABLE 3

| | Amount of Addition (wt %) | | Physical Property |
|---|---|---|---|
| | Carbon* black | Polypropylene glycol/Polyethylene glycol ether copolymer | Falling weight impact (joul) |
| Example 12 | 3.0 | 3.0 | 47.5 |
| Comparative Example 4 | 3.0 | 0 | 7.9 |

*Furnace black

We claim:

1. A polyacetal resin composition comprising a polyacetal resin, 0.1 to 30 weight % of carbon black, and 0.1 to 10 weight % of a nonionic surfactant having a molecular weight of 1,300 to 15,000 and comprising a polypropylene glycol/polyethylene glycol ether block copolymer consisting of a polypropylene glycol block as the hydrophobic portion and a polyethylene glycol block as the hydrophilic portion, the hydrophobic block portion of the copolymer having a molecular weight of 1,000 to 2,000, wherein said weight percentages are based upon the total resin composition.

2. The composition of claim 1 wherein the nonionic surfactant is present in an amount of 1 to 5 weight %.

3. The composition of claim 1 wherein the carbon black is present in an amount of 0.5 to 10 weight %.

4. The composition of claim 1 including a low molecular weight polyolefin wax.

5. The composition of claim 1 wherein the polyethylene wax is prepared by a thermal decomposition process.

6. The composition of claim 1 including as an antioxidant, an amine.

7. A polyacetal resin composition comprising a polyacetal resin, 0.5 to 10 weight % of carbon black, 0.1 to 10 weight percent of a nonionic surfactant having a molecular weight of 1,300 to 15,000 and comprising a polypropylene glycol/polyethylene glycol ether block copolymer consisting of a polypropylene glycol block as the hydrophobic portion and a polyethylene glycol block as the hydrophilic portion, the hydrophobic block portion of the copolymer having a molecular weight of 1,000 to 2,000, and 0.1 to 15 weight % of an amide compound represented by the general formula:

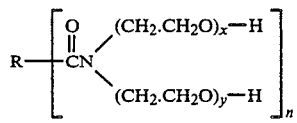

wherein R is a carboxylic acid residue which is a saturated or unsaturated hydrocarbon radical having 2 or more carbon atoms, or a fundamental unit of a vinyl polymer or copolymer, x and y are each 0 or an integer of 1 or above, and n is an integer of 1 or above, wherein said weight percentages are based upon the total resin composition.

8. The composition of claim 7 wherein n is an integer of 1 to 6.

9. The composition of claim 7 wherein x and y are each an integer of 1 to 10.

10. The composition of claim 7 wherein R represents a carboxylic acid residue which is a saturated or unsaturated hydrocarbon radical having 2 to 23 carbon atoms.

* * * * *